United States Patent
Elder et al.

(10) Patent No.: US 10,313,485 B2
(45) Date of Patent: Jun. 4, 2019

(54) SPANNING TREE PROTOCOL

(71) Applicant: Metaswitch Networks Limited, Enfield, Middlesex (GB)

(72) Inventors: Alan Elder, Enfield (GB); Jonathan Harrison, Enfield (GB)

(73) Assignee: Metaswitch Networks Limited, Enfield, Middlesex (GB)

( * ) Notice: Subject to any disclaimer, the term of this patent is extended or adjusted under 35 U.S.C. 154(b) by 140 days.

(21) Appl. No.: 14/673,652

(22) Filed: Mar. 30, 2015

(65) Prior Publication Data
US 2015/0280964 A1 Oct. 1, 2015

(30) Foreign Application Priority Data
Mar. 31, 2014 (GB) .................................. 1405777.2

(51) Int. Cl.
*H04L 29/06* (2006.01)
*H04L 12/753* (2013.01)
*H04L 12/24* (2006.01)
*H04L 12/751* (2013.01)

(52) U.S. Cl.
CPC .............. *H04L 69/03* (2013.01); *H04L 45/48* (2013.01); *H04L 41/042* (2013.01); *H04L 45/02* (2013.01)

(58) Field of Classification Search
CPC ......... H04L 69/03; H04L 45/48; H04L 45/02; H04L 41/042
See application file for complete search history.

(56) References Cited

U.S. PATENT DOCUMENTS

| | | | | |
|---|---|---|---|---|
| 6,202,114 B1* | 3/2001 | Dutt | ..................... | H04L 12/4625 710/311 |
| 6,330,229 B1* | 12/2001 | Jain | ..................... | H04L 12/4625 370/256 |
| 6,898,189 B1* | 5/2005 | Di Benedetto | ......... | H04L 41/00 370/217 |
| 7,480,258 B1* | 1/2009 | Shuen | ..................... | H04L 45/00 370/217 |
| 7,729,296 B1 | 6/2010 | Choudhary | | |

(Continued)

FOREIGN PATENT DOCUMENTS

EP 2645645 A1 10/2013

*Primary Examiner* — Blake J Rubin
(74) *Attorney, Agent, or Firm* — Stetina Brunda Garred & Brucker

(57) ABSTRACT

The invention relates to managing operation of a spanning tree protocol process in a network bridge having a central controller and one or more port controllers, each for controlling one or more ports of said network bridge. The spanning tree protocol process comprises a plurality of state machines including a Port Information state machine. The Port Information state machine comprises an UPDATE state and a plurality of other states. The invention involves running a Protocol Manager on a central controller, wherein the Protocol Manager owns the UPDATE state such that updates are carried out by the Protocol Manager. The Neighbor Managers on each of the port controllers owns the plurality of other states of the Port Information state machine, such that updates are carried out by the respective Neighbor Manager on said port controller. This allows the Protocol Manager and the Neighbor Managers to operate without having to force one to pause whilst work is done on the other.

20 Claims, 3 Drawing Sheets

(56) References Cited

U.S. PATENT DOCUMENTS

| | | | |
|---|---|---|---|
| 7,877,483 B1* | 1/2011 | Finn | H04L 12/4641 370/256 |
| 9,774,401 B1* | 9/2017 | Borrill | H04L 9/0852 |
| 9,942,097 B2* | 4/2018 | Gandhi | H04L 45/245 |
| 9,960,987 B2* | 5/2018 | Claggett | H04L 43/10 |
| 2003/0123457 A1 | 7/2003 | Koppol | |
| 2003/0142680 A1* | 7/2003 | Oguchi | H04L 45/18 370/400 |
| 2003/0179707 A1* | 9/2003 | Bare | H04L 12/185 370/235 |
| 2003/0208618 A1* | 11/2003 | Mor | H04L 45/00 709/238 |
| 2004/0081171 A1* | 4/2004 | Finn | H04L 12/462 370/395.53 |
| 2004/0105455 A1* | 6/2004 | Seaman | H04L 45/00 370/423 |
| 2005/0198232 A1* | 9/2005 | Haalen | H04L 41/082 709/221 |
| 2006/0007939 A1* | 1/2006 | Elangovan | H04L 12/465 370/395.53 |
| 2006/0146845 A1* | 7/2006 | Rose | H04L 12/462 370/402 |
| 2007/0008964 A1* | 1/2007 | Rose | H04L 12/66 370/389 |
| 2007/0025275 A1* | 2/2007 | Tallet | H04L 45/02 370/255 |
| 2007/0047472 A1* | 3/2007 | Florit | H04L 12/437 370/256 |
| 2007/0064628 A1* | 3/2007 | Tallet | H04L 45/00 370/256 |
| 2007/0258390 A1* | 11/2007 | Khan | H04L 12/462 370/256 |
| 2007/0263640 A1* | 11/2007 | Finn | H04L 12/5695 370/401 |
| 2008/0275975 A1* | 11/2008 | Pandey | H04L 49/40 709/223 |
| 2008/0310421 A1* | 12/2008 | Teisberg | H04L 12/4641 370/395.53 |
| 2009/0022069 A1* | 1/2009 | Khan | H04L 12/4633 370/256 |
| 2009/0268746 A1* | 10/2009 | Ogasahara | H04L 12/413 370/406 |
| 2010/0054157 A1* | 3/2010 | Farkas | H04L 12/4633 370/256 |
| 2010/0325257 A1* | 12/2010 | Goel | H04L 29/12028 709/223 |
| 2011/0116366 A1* | 5/2011 | Smith | H04L 45/02 370/225 |
| 2014/0047260 A1* | 2/2014 | Iijima | G06F 1/3287 713/324 |
| 2014/0086099 A1* | 3/2014 | Li | H04L 69/324 370/254 |
| 2014/0313932 A1* | 10/2014 | Saltsidis | H04L 41/082 370/254 |
| 2015/0271104 A1* | 9/2015 | Chikkamath | H04L 12/4633 370/401 |
| 2016/0007273 A1* | 1/2016 | Farid | H04W 48/16 370/329 |
| 2016/0065407 A1* | 3/2016 | Saltsidis | H04L 41/0806 370/255 |
| 2016/0087848 A1* | 3/2016 | Heinz | H04L 45/08 370/256 |
| 2019/0007288 A1* | 1/2019 | Wen | H04L 43/0811 |

* cited by examiner

SPANNING TREE PROTOCOL

CROSS REFERENCE TO RELATED APPLICATIONS

The present application claims priority to UK Patent Application No. 1405777.2 filed Mar. 31, 2014, the entirety of the disclosure of which is expressly incorporated herein by reference.

STATEMENT RE: FEDERALLY SPONSORED RESEARCH/DEVELOPMENT

Not Applicable.

FIELD OF THE INVENTION

The present invention relates to operation of a Spanning Tree Protocol and in particular management of how the processing elements of the protocol are carried out.

BACKGROUND OF THE INVENTION

The Spanning Tree Protocol is a network protocol which is designed to maintain a loop-free topology in a bridged local area network. A family of spanning tree protocols is defined in IEEE 802.1D (802.1D-2004-*IEEE Standard for Local and metropolitan area networks: Media Access Control (MAC) Bridges*) and IEEE 802.1Q (802.1 Q-2011-*IEEE Standard for Local and metropolitan area networks—Media Access Control (MAC) Bridges and Virtual Bridged Local Area Networks*), the content of which is incorporated herein. These protocols are widely deployed in Ethernet networks.

The family of Spanning Tree Protocols includes the original Spanning Tree Protocol (STP), Rapid Spanning Tree Protocol (RSTP) and Multiple Spanning Tree Protocol (MSTP). RSTP is an extension of the original STP and provides significantly faster conversions after a change in the topology of a network. MSTP is a further extension to RSTP to allow it to construct different active topologies for different VLANs which can be useful for load balancing traffic. The configuration and operation of these protocols is defined by the IEEE standards mentioned above as a series of interconnected state machines. FIG. 1 shows FIG. 13-13 from IEEE 802.1Q-2011 (page 354). This figure shows the series of interconnected state machines used to operate the STP protocols.

The basic function of the Spanning Tree Protocol is to allow the bridges (sometimes referred to as switches) of a Bridged Local Area Network (referred to as a network herein) to collectively determine a spanning tree for controlling communication across the network. Such a spanning tree ensures that there are unique paths between all bridges on the network and avoids the formation of loops. Loops are particularly disadvantageous in such networks as frames can end up being endlessly switched around the network leading to saturation of the network capacity and potentially complete failure of the network. It is therefore extremely important that such loops are avoided.

The Spanning Tree Protocol is therefore used to establish a spanning tree based on the current layout and state of the elements of a network. However, the topology of a network can change. The removal of a bridge from a network or even one the disabling of port on a bridge, may result in the path between two elements on the network being removed. It would therefore be necessary for the spanning tree to be modified or recalculated to provide an alternative link path between each of the elements of the network to allow continued communication between them. This active responsiveness to changes in topology requires active monitoring and maintenance using the Spanning Tree Protocol.

As indicated above, the bridges collectively compute the spanning tree, with each bridge making its own calculations to determine which ports on that bridge are used for what purpose. Each bridge will therefore have to run the state machines shown in FIG. 1 in order to establish how it should manage its own ports. It will then communicate with other bridges in the network using special frames called Bridge Protocol Data Units (BPDUs) to exchange information about themselves and the network with other bridges in the network.

For example, the network initially needs to determine a root bridge which acts as the root of the spanning tree. Once the root bridge has been determined, each bridge then determines the least cost path to the root bridge, to establish which port is connected to the path that has the least cost to the root bridge. That port is then determined as the root port and communication with the root bridge will be made through that port.

For each Local Area Network (LAN) connected to ports on two or more bridges, it is necessary to determine a designated port for that LAN on a suitable bridge. Thus for a given LAN connected to two or more bridges, one of the ports on one of the bridges will be determined to be the designated port for that LAN and communication between that LAN and the root bridge will pass through the designated port. For each LAN, if the bridge with the port selected as the designated port for that LAN has any other ports to the same LAN, these ports are determined to be backup ports. Once the root ports, designated ports and backup ports have been determined, the remaining ports will normally be selected as alternate ports (although some versions of the standard allow different port roles to be defined). Ports with roles Alternate or Backup are blocked, meaning that frames are not switched through those ports.

The configuration of the spanning tree for a given network is defined in detail in the IEEE standards mentioned above.

From the above, it will be apparent that when a network is initially configured or when the topology has changed, a significant amount of calculation must be done to establish the correct states for the bridge and its ports. This is done by running the state machines shown in FIG. 1, as defined in the IEEE standard. As part of this, a considerable amount of information must be exchanged between the bridges so that each bridge can collect suitable information about which bridge is to be the root, the path cost to the root and so on. In order to establish the state of the bridges, the state machines in each bridge run until they reach a stable state. Once the state machines in all the bridges are stable, then it can be said that the network has reached steady state, at that moment in time.

However such a stable state may be disturbed by some event which requires the status of the spanning tree state machines to be reviewed, for example the reception of an external input such as a timer pop, a received packet, or a port going down. Such input events cause the state machines to run again until they reach a stable state. It will be appreciated that when one part of a network changes then this may trigger the state machines in one bridge to run and potentially determine a different set of conditions/states. This will be communicated using BPDU frames to advise the other bridges in the network of the change in its state. The reception of such frames by other bridges will cause them to run their own state machines until they again reach a stable state based on the newly received information. It will be appreciated that the changes may create a cascade of changes of state in other bridges as each of the bridges recalculate their own states and issue BPDU frames to other bridges which in turn cause them to calculate their own state and so on.

As will be apparent from the state machines shown in FIG. 1, when it is necessary to run the state machines there is a considerable processing load in order to complete the task. Some of the state machines have to be run for each port on the bridge, so where there are a large number of ports, this can be quite an onerous task for the processor carrying out the operation. It is therefore desirable to distribute the operation of the protocol across multiple components. This is desirable as it can be used to transfer some of the processing load from a central controller to other elements, for example, line cards within a bridge or processors in a multi-core CPU.

FIG. 2 shows schematically the layout for a bridge 1. The bridge includes a central controller card 2 and a plurality of line cards 3 (only three are shown in FIG. 2). Each of the line cards may include one or more separate ports 4. The state machines of the STP protocol can be allocated to different parts of the bridge, some to the central controller card 2 and some to the line cards 3 rather than all the state machines being run on the central controller 2. By offloading protocol operations to the line cards, the load on the central controller card 2 can be reduced such that at steady state, those components of the protocol operation allocated to the line cards perform all of the work with little or no load on the central controller card.

By distributing components of the protocol operation to line cards, delays in receiving, processing and sending bridging protocol data units (BPDUs) can be minimised. If all these frames had to be processed by a central controller card, there is a risk that a delay may be introduced in processing these frames and such delay could result in the creation of a switching loop within the network which, as indicated above, is potentially catastrophic to the operation of the network.

However, the spanning tree protocol specifies the internal operation of the protocol within each bridge in terms of multiple interconnected state machines. The operation of a given state machine may depend upon variables and states determined by one or more of the other state machines. Consequently the complex interconnectedness of these machines makes dividing them between distributed elements difficult. Simply allocating some of the state machines to the line cards whilst allocating some of the state machines to the central controller card will create logistical problems because a state machine running on a line card may require information from the operation of a state machine on the central controller and vice versa. All such splits result in excessive communication between the central controller and the line cards which detrimentally affects the operation of the overall system and may result in a delay in achieving a stable state. Furthermore, unless the interaction between the state machines is carefully controlled and synchronised, it may cause a switching loop to develop, with disastrous consequences for the network.

It is therefore an aim of the present invention to overcome or at least ameliorate some of the problems referred to above.

SUMMARY OF THE INVENTION

Therefore, according to the present invention there is provided a method for managing operation of a spanning tree protocol process in a network bridge having a central controller and one or more port controllers, each for controlling one or more ports of said network bridge, wherein the spanning tree protocol process comprises a plurality of state machines including at least a Port Information state machine and said Port Information state machine comprises an UPDATE state and a plurality of other states, the method comprising: running a protocol manager on said central controller, wherein said protocol manager owns said UPDATE state such that updates are carried out by the protocol manager; and running a neighbour manager on each of said port controllers, wherein each of said neighbour managers owns said plurality of other states of said Port Information state machine, such that updates are carried out by said respective neighbour manager on said port controller.

The invention provides a means of operating a spanning tree protocol process in a network bridge where the load on the elements of the bridge is managed, in particular to minimise the load on the central controller whilst avoiding the need to delay processing in some of the processing elements whilst other processing elements complete their operation and also whilst still avoiding the risk of creating loops in the network.

The invention may be operated in a network bridge having separate line cards on which the port controllers are provided along with a separate central controller. Alternatively, the invention may be implemented on a multi-processor system where one or more of the central controller and the port controllers are allocated to different processors of the multi-processor system.

The method may further comprise the protocol manager sending information, relating to changes to state machine variables resulting from running the UPDATE state, to at least one of the neighbour managers. This allows the changes to be provided and utilised by the neighbour managers as part of running their part of the Port Information state machine so that the information is available as soon as possible for when they are run.

The information stored by the neighbour managers may be overwritten with corresponding information relating to the changes sent by the protocol manager. In this way, the new information updates the stored information so that the freshest data is used when the state machines are run next.

Preferably, the method further comprises sending information from the neighbour managers to the protocol manager, the information relating to changes to state machine variables resulting from running the plurality of other states. In a similar way to above, the information is provided to the protocol manager for use in running its own state machines, including the UPDATE state.

The method may further comprise tagging the information sent from the neighbour managers with a sequence number; and determining whether to overwrite information stored by the protocol manager with corresponding information relating to the changes sent by said neighbour managers, based on the sequence number. In order to avoid conflicts in the information received, the information in the protocol manager is treated to be superior unless the sequence number suggests that the information from the neighbour manager is fresher than the current information.

The UPDATE state is preferably run contemporaneously in the protocol manager and the plurality of other states run in one or more of the respective neighbour managers. This helps to prevent delays by deferring operation of some state machines and should lead to the bridge reaching a stable state in all the state machines more quickly.

If the UPDATE state and the other states are run contemporaneously, then information may be sent asynchronously between the protocol manager and the neighbour managers and vice versa. As indicated above, running the UPDATE and other state at the same time allows them to reach a stable state more quickly. This can be further enhanced by sending the results as soon as they are ready rather than delaying until all the parts are completed or according to some schedule.

The present invention also provides a network bridge for operating a spanning tree protocol process, wherein the spanning tree protocol process comprises a plurality of state machines including a Port Information state machine, and said Port Information state machine comprises an UPDATE state and a plurality of other states, the network bridge comprising: a central controller arranged to run a protocol manager; and one or more port controllers for controlling one or more ports of said network bridge, each port controller arranged to run a respective neighbour manager, and wherein: said protocol manager owns said UPDATE state such that updates are carried out by the central controller; and each said neighbour manager owns said plurality of other states such that updates are carried out by a respective one of said one or more port controllers.

The protocol manager is preferably arranged to send information to at least one of the neighbour managers relating to changes to state machine variables resulting from running the UPDATE state.

Each of said neighbour managers may be arranged to receive the information and update corresponding information stored by the neighbour manager.

Preferably, each of the neighbour managers is arranged to send information to the protocol manager relating to changes to state machine variables resulting from running the plurality of other states.

The neighbour managers are preferably arranged to tag the information with a sequence number. The protocol manager may then determine whether to overwrite information stored by the protocol manager with corresponding information sent by the neighbour managers, based on the sequence number.

The protocol manager and the neighbour managers may be respectively arranged such that the UPDATE state may be run contemporaneously with the running of the plurality of other states.

The information sent between the protocol manager and the neighbour managers and the information sent between the neighbour managers and the protocol manager may be sent asynchronously.

BRIEF DESCRIPTION OF THE DRAWINGS

The present invention will now be described in more detail by way of non-limiting examples by reference to the attached drawings, in which.

DESCRIPTION OF THE PREFERRED EMBODIMENTS

Section 13.22 of the IEEE 802.1 Q-2011 Standard specifies that each spanning tree protocol entity's operation is specified by the following state machines:

a) Port Role Selection (PRS)
b) Port Timers (PTI)
c) Port Protocol Migration (PPM)
d) Port Receive (PRX)
e) Port Transmit (PRT)
f) Bridge Detection (BDM)
g) Layer 2 Gateway Port Receive (L2GPRX)
h) Port Information (PIM)
i) Topology Change (TCM)
j) Port Role Transitions (PRT)
k) Port State Transition (PST)

Figure 1:
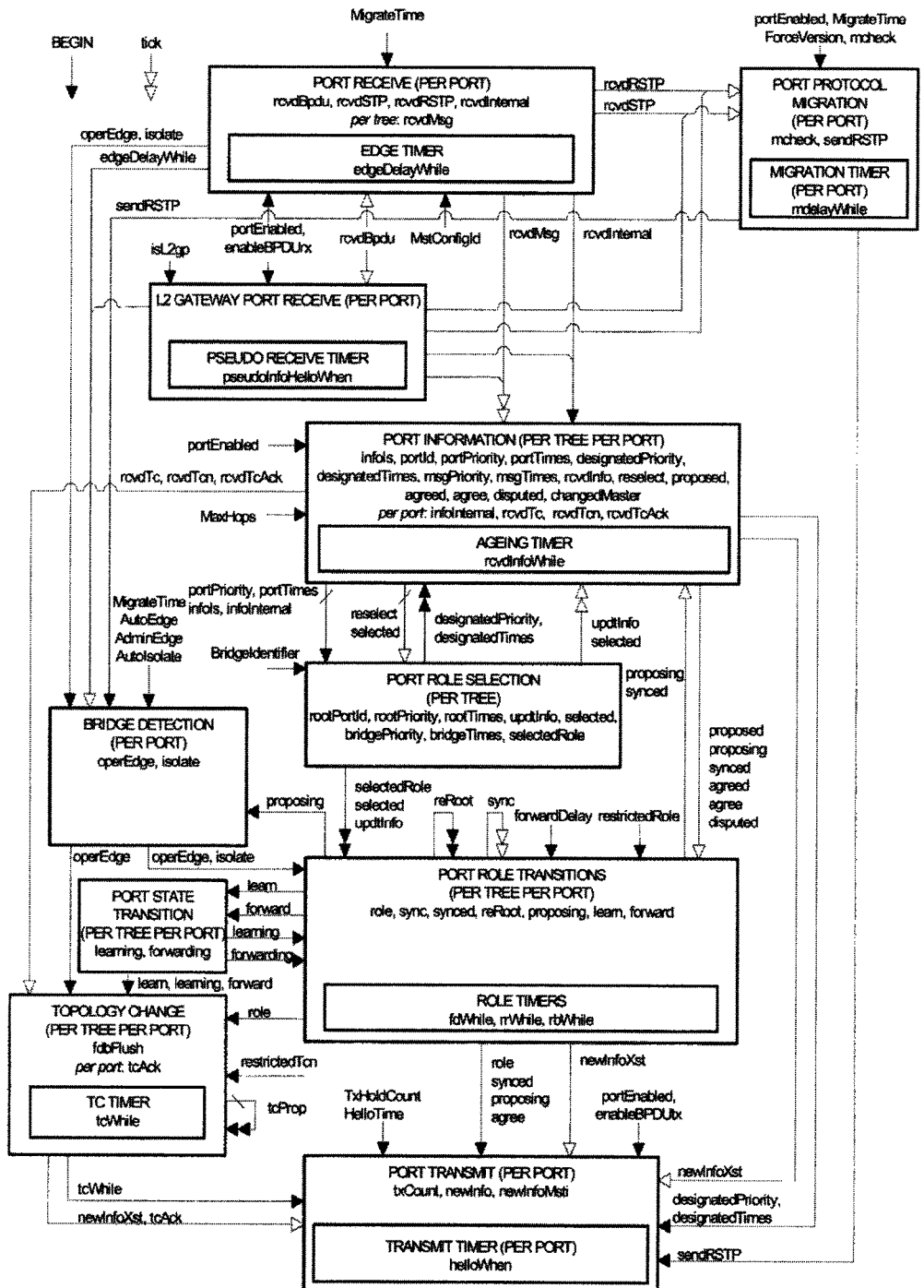
FIG. 1 shows an overview diagram of the state machines used to establish a spanning tree using the Spanning Tree Protocol.
Figure 2:
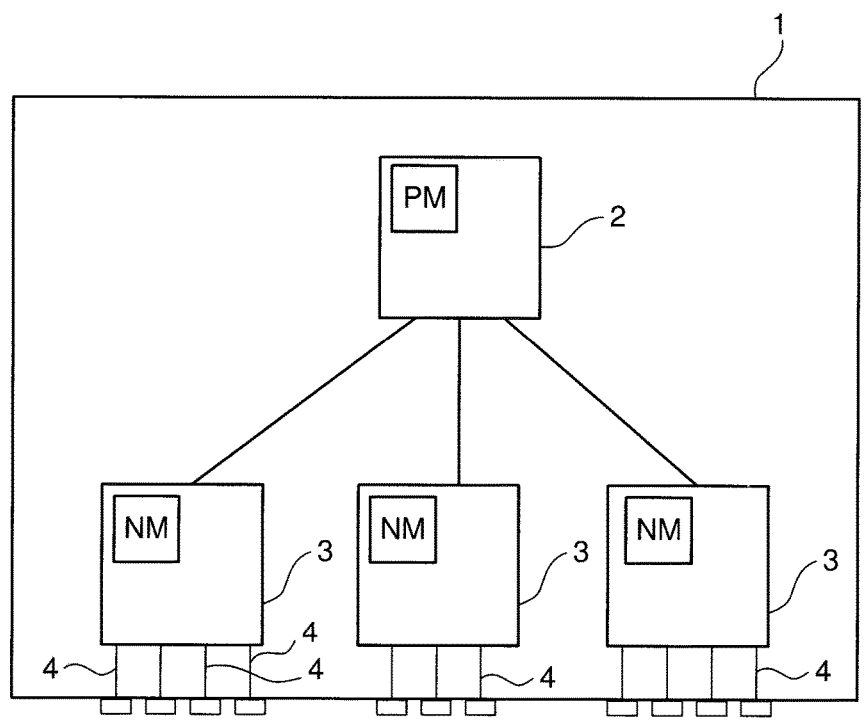
FIG. 2 shows a schematic layout of the elements of a bridge.

As shown in FIG. 2, the implementation of the spanning tree protocol in a bridge can be achieved by allocating the state machines to different elements of the bridge. The central controller has a Protocol Manager (PM) component which is responsible for protocol decisions that potentially require knowledge of more than one port. The line cards 3 include a Neighbour Manager (NM) component. On each card the Neighbour Manager is responsible for managing the per-port state, i.e. the states related to its specific ports. In FIG. 2, the line cards and the associated Neighbour Manager are responsible for 3 or 4 ports but a Neighbour Manager may manage a single port or any number of ports. The Neighbour Manager is also responsible for sending and receiving Protocol Messages (BPDUs).

In the present invention, state machines are distributed between the Protocol Manager and the Neighbour Manager to balance the workload and to alleviate the workload of the Protocol Manager. In a steady state situation, the Protocol Manager should perform no work and the Network Managers should be responsible for periodic message transmission and reception. If the Protocol Manager needed to be involved in the reception/transmission of every protocol message then the benefit of distributing the state machines would be largely lost.

The state machines are allocated to the Neighbour Managers and the Protocol Manager according to their function and interaction with the other state machines. The state machines are allocated to the appropriate manager to ensure that required variables and states are available to allow each state machine to run properly and achieve a stable state. Furthermore they must also be able to provide suitable information for the other state machines to operate correctly.

For some of the state machines, the allocation is relatively clear. However, for some of the state machines, there is no logical allocation to the Neighbour Manager or the Protocol Manager as regardless of which they are allocated to, there will be a requirement for exchanging information to or from a respective manager for the completion of all the state machines.

The Bridge Detection, Port Receive and Port Protocol Migration state machines are all per-port state machines that process received frames. These are therefore allocated to be run on each of the respective Neighbour Manager components. The Port Transmit state machine is also a per-port state machine that is responsible for periodic transmission of protocol messages and so again it is suitable to allocate it to the Neighbour Manager. The Layer 2 Gateway Port Receive state machine is similar to the Port Receive state machine, and so is it is allocated to the Neighbour Manager.

The Port Role Selection state machine selects port roles using information from all ports and so it logically should be owned by the Protocol Manager. The Port Role Transition state machine operates in the context of a single port but makes use of states belonging to other ports and so again is best managed by the Protocol Manager.

The Port State Transition state machine runs per-interface, but is closely tied in with the Port Role Transition state machine, and so it is allocated to the Protocol Manager (although it doesn't necessarily need to be).

The Port Timers state machine updates various timer variables used by the state machines. In this embodiment, there is effectively an instance in both the Protocol Manager and the Neighbour Manager (although this is not essential to the invention), which updates those timers used by the state machines in each component.

The Topology Change state machine is not clearly owned by either Protocol Manager or Neighbour Manager. Most of the state machine is owned by Protocol Manager, because the state machine is responsible for propagating a topology change from one port to others and so needs to be aware of all ports. However, one part of the state machine sets variables that result in the periodic transmission of BPDUs indicating a topology change, and that part of the state machine should be owned by Neighbour Manager. Specifically, when Protocol Manager's Topology Change machine for a port and tree passes through the DETECTED and NOTIFIED_TCN states, Protocol Manager informs the relevant Neighbour Manager that it needs to run the newTcWhile( ) function, which results in the transmission of BDPUs advertising a topology change for that port and tree.

Figure 3:
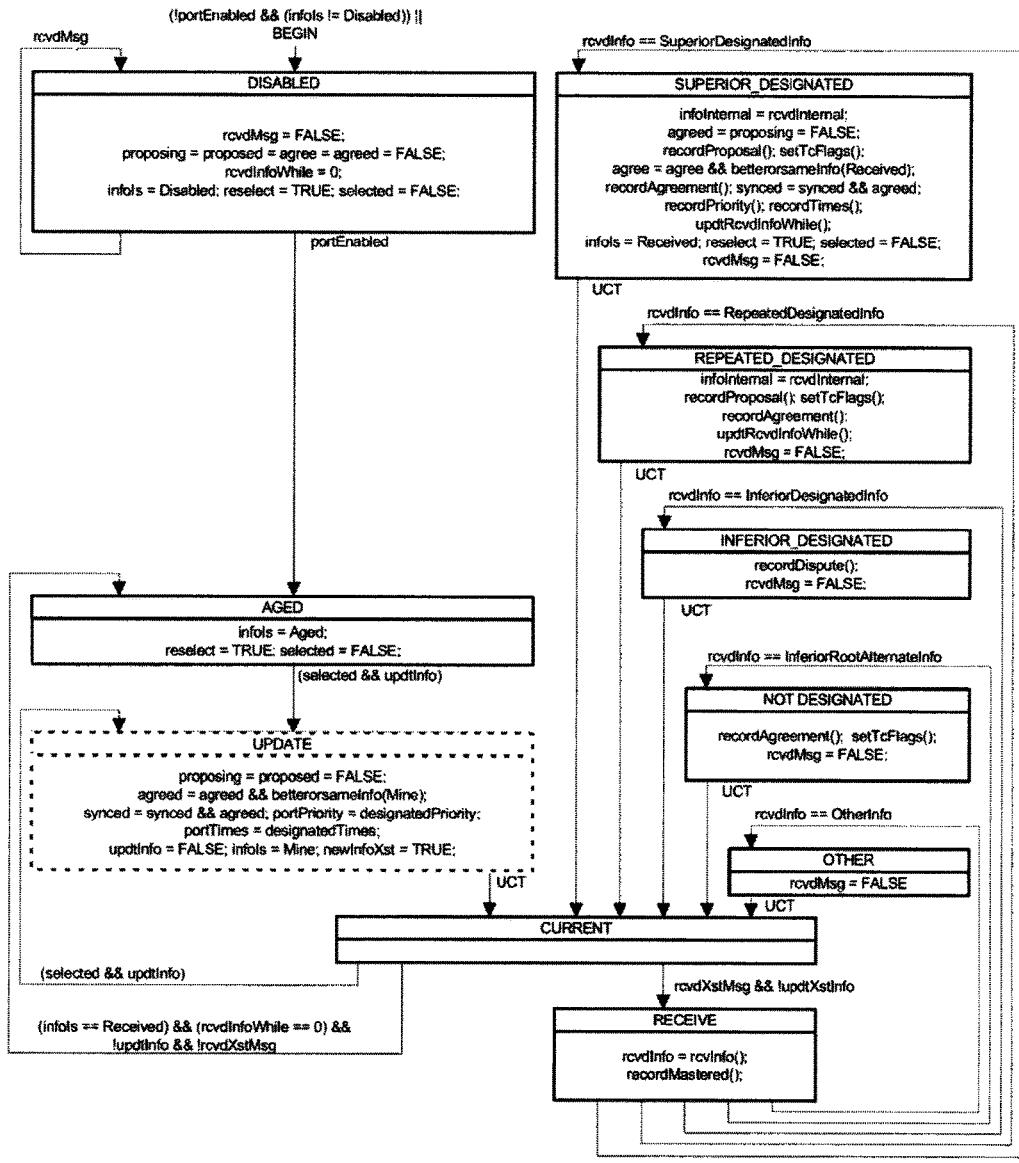
FIG. 3 shows an overview diagram of the Port Information state machine.

The position for the Port Information state machine (PIM), the detail of which is shown in FIG. 3, is less clear. This state machine may be run under a number of different circumstances, such as if a protocol message is received on a port (the PIM transitions through the RECEIVE state in FIG. 3) or if received state ages out for a port (i.e. the rcvdInfoWhile timer expires and PIM transitions through the AGED state in FIG. 3). To ensure that the Protocol Manager does not do any work in the steady state, these two triggers should be handled in the Neighbour Manager.

However, the Port Information state machine is also invoked as a result of work carried out in the Port Role Selection state machine, which is done by the Protocol Manager. If the Port Role Selection state machine sets the 'updtInfo' and 'selected' variables for a port and tree, the UPDATE part of the Port Information state machine must run before the Port Role Transition state machine runs. If the Port Information state machine is handled in the Neighbour Manager, then running the state machines involves the following steps. First the Protocol Manager runs the Port Role Selection state machine. The Protocol Manager then passes information to the Neighbour Manager so that it can run the Port Information state machine and, in particular, the UPDATE portion (shown in dotted lines in FIG. 3) of the Port Information state machine, for each port and tree for which this is required.

The Neighbour Managers may then run the Port Transmit state machine for the port, utilising the received information and transmitting a BPDU based on the updated information. After the Protocol Manager passes the updated information to the relevant Neighbour Manager and whilst the Neighbour Manager is running the Port Information state machine, the Protocol Manager is blocked from running the Port Role Transition state machine for that port and tree (because 'updtInfo' has not yet been cleared).

Only after the Port Information state machine work has been completed by the Neighbour Manager, can the Protocol Manager continue with running the Port Role Transition state machine and other Protocol Manager state machines for that port and tree. The work carried out by running these state machines includes blocking any ports required as a result of invoking the Port Role Selection state machine.

There is therefore a risk that a Neighbour Manager may transmit information into the network before those ports that have been determined to be blocked for a tree can actually be blocked. This opens the possibility of a period of time in which spanning tree protocol can inadvertently create a network loop. As indicated above, this is extremely undesirable. Whilst it may be possible to prevent such conditions occurring by using a locking mechanism to prevent one or the other of the Protocol Manager and the Neighbour Manager from running whilst the other is running, this negates the benefit of operating these as separate processes.

To overcome this, in this embodiment, and in accordance with the invention, rather than running the Port Information state machine entirely in the Neighbour Manager, the Port Information state machine is split into separate elements to be run on different components, to avoid the creation of a window condition in which a network switching loop can be created.

The UPDATE state (shown in dotted lines in FIG. 3) is run by the Protocol Manager on the central control card whilst the remainder of the Port Information state machine is run on each Neighbour Manager component.

In this arrangement, considering the example above, when the Protocol Manager runs the Port Role Selection state machine, it does not need to pass information to the Neighbour Managers so that they can run the UPDATE portion of the Port Information state machine. Instead, the Protocol Manager can run the UPDATE portion of the Port Information state machine directly without reference to the Neighbour Managers. Once the Protocol Manager has completed running the UPDATE step of the Port Information state machine it can then continue running the Port Role Transition and other Protocol Manager state machines.

The Protocol Manager notifies the Neighbour Managers of any changes to state machine variables resulting from it running the UPDATE state step of the Port Information state machine. Equally, when the Neighbour Managers run their portion of the Port Information state machine, they will also notify the Protocol Manager of any changes to state machine variables resulting from that work. This allows the Neighbour Managers and the Protocol Manager to respectively take into account any state machine work required as a result of the running of the respective parts of the Port Information state machine.

The notification mechanism used is asynchronous and so there is no need to lock or pause either the Protocol Manager or the Neighbour Managers whilst the respective state machines (or their parts) are running. Notifications from the Protocol Manager to the Neighbour Manager and vice versa can cross with each other without causing the above-mentioned window condition in which network switching loops may occur.

If notification messages do pass in this way so that the state information becomes divergent then the state held by the Protocol Manager is considered to be correct. To achieve this, the Neighbour Managers always store the information received from the Protocol Manager assuming it to be correct and effectively overriding any information they hold. In contrast, the Protocol Manager uses a sequence number to determine whether the information received about the Neighbour Manager state is out of date.

The Protocol Manager maintains a sequence number for each combination of port and tree. When the Protocol Manager runs the UPDATE part of the Port Information Machine for that port and tree pair, it increments the sequence number and sends it to the Neighbour Manager along with the updated state machine variables.

The Neighbour Manager stores the sequence number that it receives from Protocol Manager. The sequence number is included each time the Neighbour Manager sends updated state machine variables to Protocol Manager. When the Protocol Manager receives updated state machine variables from Neighbour Manager, the update is ignored if the sequence number is not equal to the current value, as this indicates that the state from the Neighbour Manager is out of date and has subsequently been over-written by operation of the UPDATE part of the Port Information state machine.

In the above embodiment, an example of distributing function between a Protocol Manager running on a central controller and Neighbour Managers running on line cards is provided. However, the same principal applies to other distributed processing arrangements where different tasks are allocated to different processing elements, for example distributing function to different processors in a multi-core CPU. References to Protocol Manager and Neighbour Manager in the context of this invention are not intended to be limited to the specific configuration of the embodiment. The Protocol Manager and Neighbour Managers may be simply considered separate elements for carrying out processing of state machines.

The invention claimed is:

1. A method for managing operation of a spanning tree protocol process in a network bridge having a central controller and one or more separate port controllers, each for controlling one or more ports of said network bridge, wherein the spanning tree protocol process comprises a plurality of state machines including at least a Port Information state machine and said Port Information state machine comprises an UPDATE state and a plurality of other states, the method comprising:
   running a protocol manager on said central controller, wherein said protocol manager owns said UPDATE state such that processing of the UPDATE state portion of the Port Information state machine is carried out by the protocol manager on said central controller; and
   running a neighbour manager on each of said port controllers, wherein each of said neighbour managers owns said plurality of other states of said Port Information state machine, such that processing of said plurality of other states of said respective Port Information state machine is carried out by said respective neighbour manager on said port controller.

2. A method for managing operation of a spanning tree protocol process according to claim 1, further comprising said protocol manager sending to at least one of said neighbour managers, information relating to changes to state machine variables resulting from running said UPDATE.

3. A method for managing operation of a spanning tree protocol process according to claim 2, further comprising overwriting information stored by said neighbour managers with corresponding in relating to said changes sent by said protocol manager.

4. A method for managing operation of a spanning tree protocol process according to claim 1, further comprising sending information relating to changes to state machine variables resulting from running said plurality of other states, from said neighbour managers to said protocol manager.

5. A method for managing operation of a spanning tree protocol process according to claim 2, further comprising sending information relating to changes to state machine variables resulting from running said plurality of other states, from said neighbour managers to said protocol manager.

6. A method for managing operation of a spanning tree protocol process according to claim 3, further comprising sending information relating to changes to state machine variables resulting from running said plurality of other states, from said neighbour managers to said protocol manager.

7. A method for managing operation of a spanning tree protocol process according to claim 4, further comprising:
   tagging the information sent from said neighbour managers with a sequence number; and
   determining whether to overwrite information stored by said protocol manager with corresponding information relating to said changes sent by said neighbour managers, based on said sequence number.

8. A method for managing operation of a spanning tree protocol process according to claim 5, further comprising running said UPDATE state in said protocol manager and said plurality of other states in one or more of said respective neighbour managers contemporaneously.

9. A method for managing operation of a spanning tree protocol process according to claim 7, further comprising sending said information between said protocol manager and said neighbour managers and said information between said neighbour managers and said protocol manager, asynchronously.

10. A method for managing operation of a spanning tree protocol process according to claim 8, further comprising sending said information between said protocol manager and said neighbour managers and said information between said neighbour managers and said protocol manager, asynchronously.

11. A network bridge for operating a spanning tree protocol process, wherein said spanning tree protocol process comprises a plurality of state machines including a Port Information state machine, and said Port Information state machine comprises an UPDATE state and a plurality of other states,
   said network bridge comprising:
   a central controller arranged to run a protocol manager; and
   one or more separate port controllers for controlling one or more ports of said network bridge, each port controller arranged to run a respective neighbour manager, and wherein:
   said protocol manager owns said UPDATE state such that processing of the UPDATE state portion of the Port Information state machine is carried out by the central controller; and
   each said neighbour manager owns said plurality of other states such that processing of said plurality of other states of said respective Port Information state machine is carried out by a respective one of said one or more port controllers.

12. A network bridge according to claim 11 wherein said protocol manager is arranged to send information to at least one of said neighbour managers relating to changes to state machine variables resulting from running the UPDATE state.

13. A network bridge according to claim 12 wherein, said each of said neighbour managers is arranged to receive said information and update corresponding information stored by said neighbour manager.

14. A network bridge according to claim 11 wherein, each of said neighbour managers is arranged to send information to said protocol manager relating to changes to state machine variables resulting from running said plurality of other states.

15. A network bridge according to claim 12 wherein, each of said neighbour managers is arranged to send information to said protocol manager relating to changes to state machine variables resulting from running said plurality of other states.

16. A network bridge according to claim 13 wherein, each of said neighbour managers is arranged to send information to said protocol manager relating to changes to state machine variables resulting from running said plurality of other states.

17. A network bridge according to claim 14, wherein:
said neighbour managers tag said information with a sequence number; and
said protocol manager determines whether to overwrite information stored by said protocol manager with corresponding information sent by said neighbour managers, based on said sequence number.

18. A network bridge according to claim 17, wherein said protocol manager and said neighbour managers are respectively arranged such that said UPDATE state may be run contemporaneously with the running of said plurality of other states.

19. A network bridge according to claim 17, wherein said information sent between said protocol manager and said neighbour managers and said information sent between said neighbour managers and said protocol manager is sent asynchronously.

20. A network bridge according to claim 18, wherein said information sent between said protocol manager and said neighbour managers and said information sent between said neighbour managers and said protocol manager is sent asynchronously.

* * * * *